May 31, 1938.  G. E. FRISZ  2,119,206
BRAKE ADJUSTING GAUGE
Filed Feb. 4, 1935  2 Sheets-Sheet 2
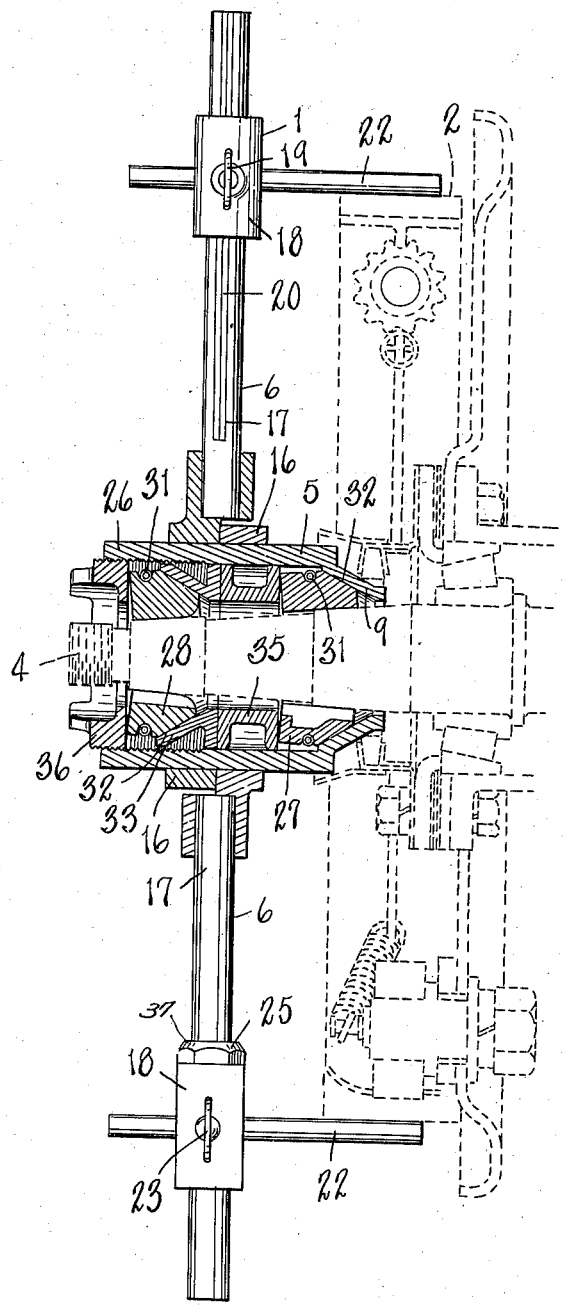
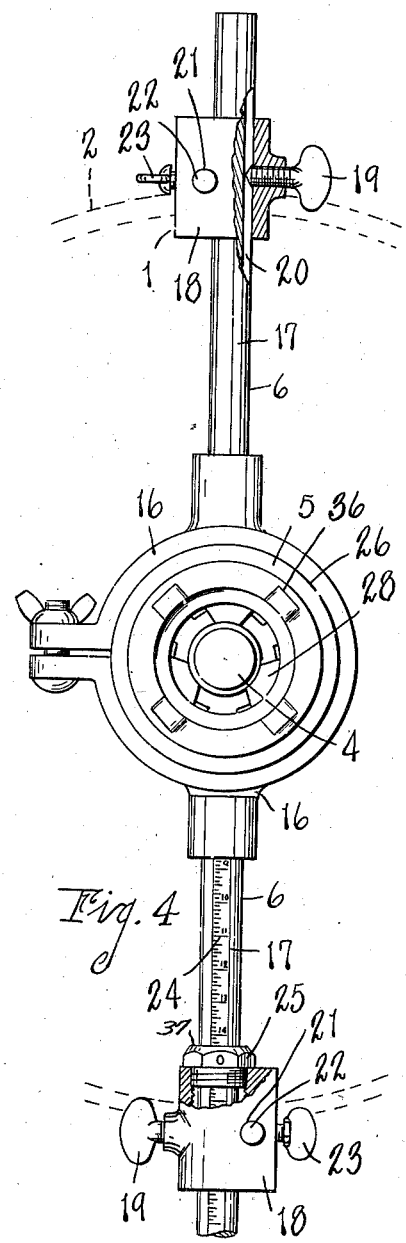
Fig. 3
Fig. 4
INVENTOR.
George E. Frisz
BY Chappell Earl
ATTORNEYS Patented May 31, 1938

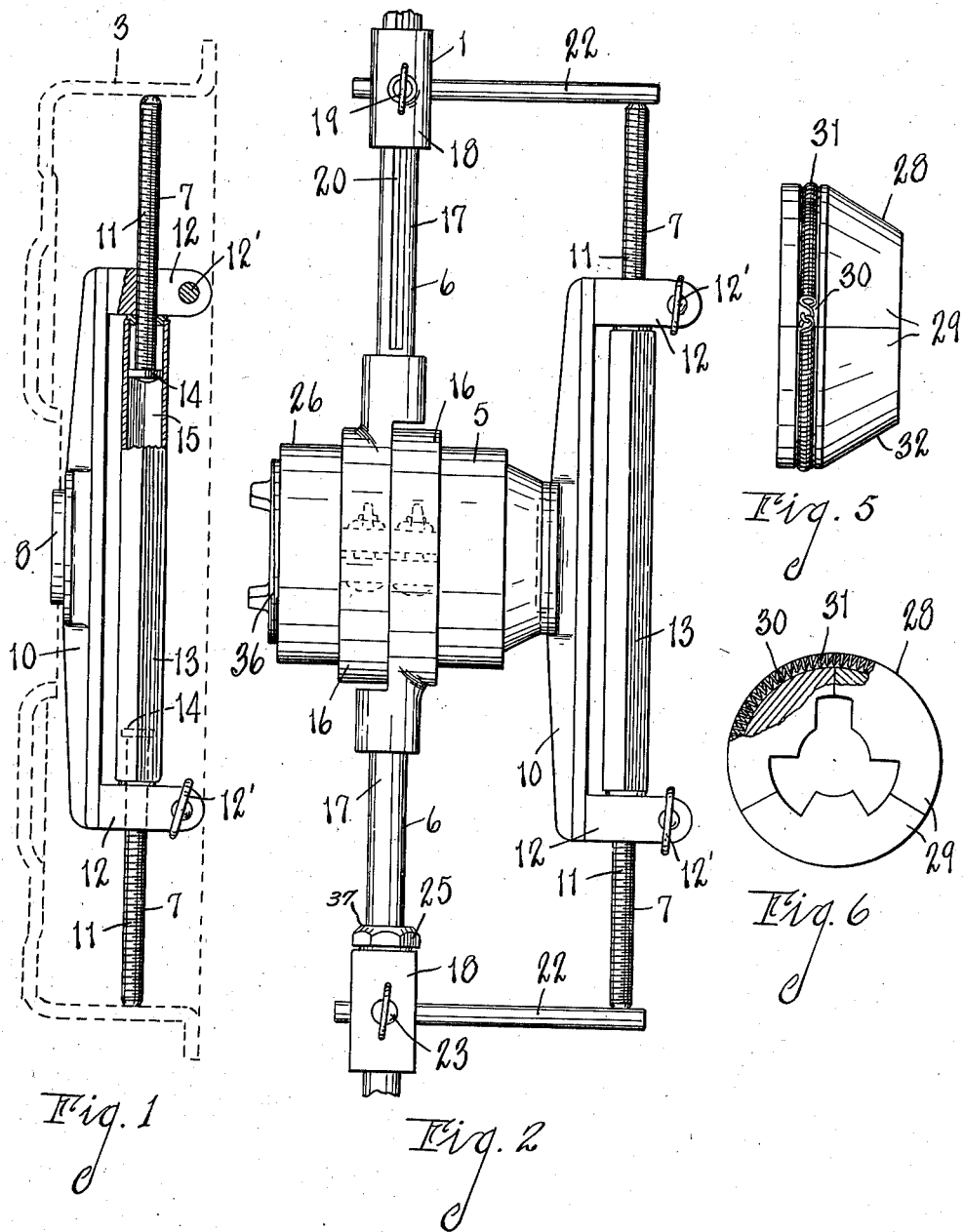

2,119,206

UNITED STATES PATENT OFFICE 2,119,206

BRAKE ADJUSTING GAUGE

George E. Frisz, Indianapolis, Ind.

Application February 4, 1935, Serial No. 4,767

20 Claims. (Cl. 33—180)

The main objects of this invention are:

First, to provide a brake adjusting gauge which is simple and economical in its parts and which is capable of use with standard and over-size axle shafts of various sizes.

Second, to provide in a gauge of the foregoing character an improved collet assembly which is adapted to be adjusted through a wide range and which is strong and serviceable and very effective for the purpose intended.

Third, to provide an improved gauge for testing, checking and adjusting automobile brakes.

Objects relating to details and economies of my invention will appear from the description to follow. The invention is defined and pointed out in the claims.

A structure which is a preferred embodiment of my invention is illustrated in the accompanying drawings, in which:

Fig. 1 is a view mainly in side elevation of the internal brake drum calipers embodying features of my invention, portions of the calipers being broken away and shown in section, a brake drum being shown by dotted lines.

Fig. 2 is a fragmentary view in side elevation of my gauge.

Fig. 3 is a view partially in side elevation and partially in section of the external brake shoe calipers embodying features of my invention, an axle shaft and brake assembly being shown by dotted lines.

Fig. 4 is a view in front elevation of the external calipers, portions of the slides being broken away and shown in section.

Fig. 5 is an enlarged view in side elevation of one of the expanding collets.

Fig. 6 is a view in end elevation of the collet, a portion of the same being broken away and shown in section.

Referring to the drawings, I provide a gauge generally indicated by the numeral 1, Fig. 2, for adjusting automobile brakes especially of the internal type, wherein brake shoes 2, Fig. 3, are adapted to be expanded into engagement with a brake drum 3, Fig. 1, carried by a wheel (not shown) which is removably mounted on an axle shaft 4, Fig. 3, of the vehicle. Brakes of this type are well known and therefore need no further description here.

In adjusting automobile brakes of this character, it is necessary that the heel and toe of each brake shoe be properly spaced a predetermined distance from the brake drum and that the parts be in concentric relation to secure maximum efficiency and so that the braking action wears evenly on the wearing surface at the inside of the brake drum. My brake adjusting gauge is adapted to accurately check these features of the brake so that the parts may be correctly adjusted.

My brake adjusting gauge 1 comprises a cylindrical barrel or casing 5 containing adjustable collet means and having mounted thereon for rotary adjustment a pair of external brake shoe calipers 6 and a pair of internal brake drum calipers 7. The internal calipers 7 have a center pivot stud 8 removably disposed in the tapered inner end 9 of the casing 5. The external calipers 6 are mounted on the casing for longitudinal and rotary adjustment.

Referring to Fig. 1, the internal brake drum calipers 7 comprise a frame 10 having alined arms 11 threaded to opposite sides 12 thereof, and a turnbuckle 13 disposed between said sides and coacting with the inner ends 14 of the arms for rotating them simultaneously. The turnbuckle has a central longitudinal bore 15 in which the inner ends 14 of the arms 11 are splined for longitudinal movement. Thus, when the turnbuckle 13 is rotated, the arms 11 are simultaneously advanced or retracted relative to each other and to the center pivot 8 which is preferably made integral with the frame. The arms are clamped in adjusted position by means of thumb screws 12' which connect the parts of the split arms 12 for this purpose.

Referring to Figs. 2, 3, and 4, a pair of ring clamps 16 are disposed on the casing 5, each ring clamp having a radial arm 17 secured thereto at its inner end. A slide 18 is mounted on each arm and has a thumb screw 19 engaging the arm in a longitudinal groove 20 for keeping the slide in adjusted position and preventing rotational movement thereof relative to the arm. The slides are provided with cross bores 21 and cross pins or gauge fingers 22 are disposed therethrough, each slide being provided with a thumb screw 23 for securing the cross pin in adjusted position.

One of the radial arms 17 is preferably provided with a scale 24 calibrated in length, the slide on such arm having a micrometer nut 25 threaded thereto for coaction with the scale. The radial distance between the inner side of the gauge finger 22 and any calibration on the scale may be accurately determined by using the micrometer nut 25 in conjunction with the scale 24, the nut being hexagonal so that each sixth turn represents .010 of an inch drum diameter. This is very important in determining the thickness of brake lining to be installed on brake shoes to be used in oversize or rebored brake drums so that the outer diameter of the brake lining is the same radius as the inside diameter of the brake drum. This is also very useful in setting the toes relative to the heels of the brake shoes.

The cylindrical casing or barrel 5 is, in the embodiment illustrated, provided with the tapered inner end 9 and an internally threaded outer end 26. Within the casing, I dispose a pair of collets 27 and 28, each in general consisting of a plurality of sections or complementary segments 29 having an annular groove 30 and a coiled spring 31 disposed in the groove and acting to contact the sections. The inner ends of the collets are tapered at 32, the tapered inner end of the inner collet 27 coacting with the tapered inner end 9 of the casing 5.

An annular spacing member 33 is arranged between the collets and has a tapered socket 34 receiving the tapered inner end of the outer collet 28. The spacing member 33 is separated from the inner collet 27 by a ring 35 which may be of any desired length to suit the size and shape of the axle shaft 4. Several rings 35 of various lengths are provided with the instrument so that the collet assembly may be used with practically all standard and oversize axle shafts on the market.

A nut 36 for contracting the collets is threaded in the outer end of the barrel, the contracting of the collets by the tightening of the nut automatically centering the barrel 5 on the axle shaft 4 as shown by Figure 3. The collets when fully contracted are spaced a substantial distance from the wall of the barrel for a wide range of expansion, so that the device is capable of use with both standard and oversize axle shafts of various diameters. In this respect, I provide a universal collet assembly.

In using my brake adjusting gauge, the wheel is first removed from the axle shaft 4 and the internal brake drum calipers 7 are disposed within the brake drum 3 to accurately caliper the actual braking surface of the drum, the arms 11 being adjusted by manipulating the turnbuckle 13. The internal calipers 7 are then assembled with the external brake shoe calipers 6 as shown by Fig. 2, the center pivot 8 of the internal calipers being disposed in the tapered inner end 9 of the casing 5. With the parts thus assembled, the center of the external calipers is common with the center of the internal calipers. The slides 18 are then adjusted to the radial arms 17 so that the cross pins 22 touch the outer ends of the arms 11, and the thumb screws 19 are tightened. This sets the cross pins 22 the same radial distance from the center of the calipers as the wearing surface of the brake drum 3 is from the center of the axle shaft 4.

The internal calipers 7 are then removed from the external calipers 6 and the latter, together with the parts within the barrel 5, are slipped on the axle shaft 4 as shown by Fig. 3. The nut 36 is tightened to center the calipers on the axle shaft and the brake shoes 2 are adjusted in the usual manner, the cross pins 22 being used for reference.

In the event that the brake drum has been rebored and is oversize, the inner face 37 of the hexagonal nut 25 will be in a position on the graduated arm to indicate a reading thereon which is greater than the original standard drum size. By turning the nut out so that the inner face thereof indicates the reading corresponding to the standard drum size on the graduated arm, the oversize or difference may be determined. For this purpose, each sixth of a turn of nut 25 represents a diametrical distance of .010 of an inch.

The method followed in determining the oversize of the brake lining which will be required for the brake shoe in the event the drum has been rebored is as follows: With cross pins 22, indicating the diameter of the brake drum as determined by arms 11, clamped on calipers 6 by thumb screw 19, micrometer nut 25 is turned in a counterclockwise direction to back the same away from slide 18 with which it is initially in flush engagement. The turning of nut 25 and motion thereof away from slide 18 is continued until the upper horizontal indicating face 37 thereof, as viewed in Figs. 2, 3 and 4, coincides with the reading corresponding to the standard drum size on the graduated arm. The number of turns, or sixths of turns, of the hexagonal nut necessitated to bring the nut to the latter position having been observed, the oversize of the drum or the difference in diameter of the rebored drum from that of the standard drum may be readily determined, inasmuch as each sixth of a turn of nut 25 represents a diametrical distance of .010 of an inch. Accordingly, a full revolution of hexagonal nut 25 represents a diametrical distance of .060 of an inch.

By this method, the proper thickness of brake lining is determined in thousandths of an inch for oversize or rebored brake drums, as it is necessary that the outer diameter of brake lining and inside diameter of brake drum be the same.

Since the pins 22 are set in correct position with respect to the concentric relation of the actual wearing surface of the brake drum with the axle shaft, they are in correct position for checking and setting the heel and toe clearances for the brake shoes. With my device, very accurate adjustments may be made and in a very short time.

From the above description of my invention, it will be apparent to those skilled in the art that I provide a gauge for adjusting automobile brakes which is universal in its application and which permits the quick and effective testing, checking and adjusting of such brakes. My gauge requires the use of comparatively few parts and therefore it is very economical to manufacture. Its simplicity and small number of parts facilitates its use in adjusting brakes. The collets are adapted to be contracted independently of each other so that the collet assembly is capable of use with axle shafts having different tapers and front wheel spindles having machined portions separated by unmachined portions.

I have not described various applications and uses to which my gauge is readily adaptable, such as the checking of axle shafts for eccentricity and in making various measurements in connection with brakes and drums, as those things will readily occur to those skilled in the art.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except in so far as is necessitated by the prior art and by the spirit of the appended claims.

Having thus described my invention, what I claim as new and desire to secure by Letters Patent is:

1. A wheel brake adjusting gauge comprising a cylindrical casing having a tapered end, adjustable collet means disposed within said casing, a pair of external brake shoe calipers mounted for longitudinal and rotary adjustment on said casing, and a pair of internal brake drum calipers having a center pivot removably disposed in the tapered end of said casing, said calipers being adjustable relative to each other and relative to a common center.

2. A wheel brake adjusting gauge comprising a cylindrical casing, adjustable collet means disposed within said casing, external brake shoe calipers mounted for longitudinal and rotary adjustment on said casing, and internal brake drum calipers having a center pivot removably disposed in said casing, said calipers being adjustable relative to a common center.

3. A wheel brake adjusting gauge comprising a casing, adjustable collet means disposed within said casing, external brake shoe calipers, internal brake drum calipers, means for removably mounting said calipers on said casing, and means for adjusting said calipers relative to each other and relative to a common center, the adjustment of said internal calipers being of equal extent and in opposite directions.

4. A wheel brake adjusting gauge comprising a casing, collet means disposed within said casing, external brake shoe calipers, internal brake drum calipers, means for removably mounting said calipers on said casing, and means for radially moving said internal calipers equal distances in opposite directions.

5. A wheel brake adjusting gauge comprising a cylindrical casing having a tapered end, adjustable collet means disposed within said casing, and a pair of internal brake drum calipers having a center pivot removably disposed in the tapered end of said casing, means for adjusting said calipers relative to each other and relative to a common center.

6. A gauge comprising a cylindrical casing provided with a tapered inner end and an internally threaded outer end, a pair of collets disposed within said casing and each consisting of a plurality of sections having an annular groove and a coiled spring disposed in said groove and acting to contract the sections, the inner ends of the collets being tapered, an annular spacing member arranged between said collets and having a tapered socket receiving the tapered inner end of the outer collet, the tapered inner end of the inner collet coacting with the tapered inner end of said casing, and a nut threaded in the outer end of said casing, and radial calipers mounted on said casing for rotary and longitudinal adjustment, the collets when fully contracted being sufficiently spaced from the casing for a wide range of expansion so that the gauge is capable of use with both standard and oversize shafts of various diameters and tapers.

7. A gauge comprising a cylindrical casing provided with a tapered inner end and an internally threaded outer end, a pair of collets disposed within said casing, the inner ends of the collets being tapered, an annular spacing member arranged between said collets and having a tapered socket receiving the tapered inner end of the outer collet, the tapered inner end of the inner collet coacting with the tapered inner end of said casing, and a nut threaded in the outer end of said casing, and radial calipers mounted on said casing for rotary and longitudinal adjustment.

8. A gauge comprising a cylindrical casing, collet means in said casing for centering the same on a tapered shaft, a pair of ring clamps disposed on said casing for longitudinal and rotary adjustment, a radial arm on each of said ring clamps and having a lateral groove, a slide mounted on each arm and having a thumb screw engaging the arm in said groove for keeping the slide in adjusted position, each slide having a cross bore, a gauge finger disposed through each bore, and means associated with the slide for securing the gauge finger in adjusted position, one of said arms having a scale calibrated in length, the slide on said calibrated arm having a micrometer nut threaded thereto for coaction with said scale.

9. A gauge comprising a cylindrical casing, collet means in said casing for centering the same on a tapered shaft, a pair of ring clamps disposed on said casing for longitudinal and rotary adjustment, a radial arm on each of said ring clamps, a slide mounted on each arm and having a thumb screw engaging the arm for keeping the slide in adjusted position, each slide having a cross bore, a gauge finger disposed through each bore, means associated with the slide for securing the gauge in adjusted position, one of said arms having a scale calibrated in length, and means carried by said slide for cooperation with said scale.

10. A gauge comprising a cylindrical casing, collet means in said casing for centering the same on a tapered shaft, ring clamps disposed on said casing for longitudinal and rotary adjustment, a radial arm on each of said ring clamps, a slide mounted on each arm and having a thumb screw engaging the arm for keeping the slide in adjusted position, each slide having a cross bore, a gauge finger disposed through each bore, and means associated with the slide for securing the gauge finger in adjusted position.

11. A gauge comprising a barrel, collet means in said barrel for centering the same on a tapered shaft, a ring clamp provided with a longitudinally grooved arm disposed on said barrel for longitudinal and rotary adjustment, a slide mounted on said arm and having a thumb screw engaging the arm in said groove for keeping the slide in adjusted position, said slide having a cross bore, a finger disposed through said bore, and means associated with the slide for securing the finger in adjusted position, said arm having a scale calibrated in length, the slide on said calibrated arm having a micrometer nut threaded thereto for cooperation with said scale.

12. A gauge comprising a barrel, collet means in said barrel for centering the same on a tapered shaft, a ring clamp provided with a longitudinally grooved arm disposed on said barrel for longitudinal and rotary adjustment, a slide on said arm, said slide having a cross bore, a finger disposed through said bore, means associated with the slide for securing the finger in adjusted position, said arm having a scale calibrated in length, and rotatable means carried by said slide to cooperate with said scale.

13. A gauge comprising a bar having upturned ends and a depending center pivot, alined arms threaded to said ends, means associated with said ends for securing said arms in adjusted position, and a turnbuckle disposed between said ends in spaced parallel relation to said bar and having a bore receiving the inner ends of said arms, said inner ends being splined to said bore, the rotation of said turnbuckle acting to simultaneously adjust said arms relative to each other and said center pivot.

14. A gauge comprising a bar having upturned ends, alined arms threaded to said ends, means associated with said ends for securing said arms in adjusted position, and a turnbuckle disposed between said ends in spaced parallel relation to said bar and having a bore receiving the inner ends of said arms, said inner ends being splined to said bore, the rotation of said turnbuckle acting to simultaneously adjust said arms relative to each other.

15. A gauge comprising a frame having a center pivot, alined arms threaded to opposite sides of said frame, means for clamping said arms in place, and a turnbuckle disposed between said sides and coacting with the inner ends of said arms for rotating them together without interfering with their longitudinal movement.

16. A gauge comprising a frame, alined arms threaded to opposite sides of said frame, and a turnbuckle disposed between said sides and coacting with the inner ends of said arms for rotating them together without interfering with their longitudinal movement.

17. A gauge comprising a barrel, collet means in said barrel for centering the same on a shaft, longitudinally grooved gauge arms mounted on said barrel for rotative and axial adjustment thereon, means for securing these arms in their adjusted positions, slides on said arms provided with thumb screws engaging the longitudinal grooves in said arms, and gauge fingers mounted on said slides for longitudinal adjustment, said fingers being disposed transversely of said arms.

18. A gauge comprising a barrel, collet means in said barrel for centering the same on a shaft, gauge arms mounted on said barrel for adjustment thereon, slides on said arms provided with means for securing them in their adjusted position, and gauge fingers mounted on said slides, one of said arms being provided with gauging indicia, the slide on such arm having a micrometer nut for coaction with said scale.

19. A wheel brake adjusting gauge comprising a casing, adjustable collet means disposed within said casing, external brake shoe calipers, internal brake drum calipers, means for removably mounting said calipers on said casing, and means for adjusting said calipers relative to each other and relative to a common center, the means for adjusting said internal calipers being operable to move said calipers outwardly or inwardly in unison.

20. A wheel brake adjusting gauge comprising a casing, collet means disposed within said casing, external brake shoe calipers, internal brake drum calipers, means for removably mounting said calipers on said casing, and means for radially moving said internal calipers equal distances outwardly or inwardly in unison.

GEORGE E. FRISZ.